United States Patent
Kaiba (10) Patent No.: US 7,500,769 B2
(45) Date of Patent: Mar. 10, 2009

(54) HEAD LIGHT DEVICE FOR VEHICLE

(75) Inventor: Kazuhiko Kaiba, Kariya (JP)

(73) Assignee: Denso Corporation (JP)

( * ) Notice: Subject to any disclaimer, the term of this patent is extended or adjusted under 35 U.S.C. 154(b) by 165 days.

(21) Appl. No.: 11/481,882

(22) Filed: Jul. 7, 2006

(65) Prior Publication Data

US 2007/0019396 A1    Jan. 25, 2007

(30) Foreign Application Priority Data

| Jul. 7, 2005 | (JP) | ............................. 2005-199345 |
| Feb. 17, 2006 | (JP) | ............................. 2006-041272 |
| Apr. 5, 2006 | (JP) | ............................. 2006-104345 |

(51) Int. Cl.
*B60Q 1/00* (2006.01)

(52) U.S. Cl. ........................ 362/465; 362/464; 362/466; 362/37

(58) Field of Classification Search ................. 362/465, 362/36–44
See application file for complete search history.

(56) References Cited

U.S. PATENT DOCUMENTS

| 6,547,424 B2 | 4/2003 | Hasumi et al. | |
| 6,634,773 B2 * | 10/2003 | Hayami | ....................... 362/464 |
| 2001/0012206 A1 * | 8/2001 | Hayami et al. | ............... 362/464 |
| 2002/0001195 A1 * | 1/2002 | Iwamoto et al. | ............. 362/466 |
| 2002/0036901 A1 * | 3/2002 | Horii et al. | ..................... 362/37 |
| 2004/0001331 A1 * | 1/2004 | Sugimoto et al. | ............. 362/44 |
| 2004/0057240 A1 * | 3/2004 | Baba et al. | ................... 362/467 |
| 2005/0018437 A1 * | 1/2005 | Hori et al. | .................... 362/465 |
| 2005/0047113 A1 | 3/2005 | Nishimura | |
| 2005/0052879 A1 * | 3/2005 | Bahnmuller et al. | ........ 362/465 |
| 2005/0243566 A1 * | 11/2005 | Hasumi | ...................... 362/465 |
| 2007/0019396 A1 * | 1/2007 | Kaiba | .......................... 362/37 |

FOREIGN PATENT DOCUMENTS

| JP | 3-42347 | 2/1991 |
| JP | 8-132955 | 5/1996 |

* cited by examiner

*Primary Examiner*—Sandra O'Shea
*Assistant Examiner*—Evan Dzierzynski
(74) *Attorney, Agent, or Firm*—Nixon & Vanderhye PC (57) ABSTRACT

A front lighting device for a vehicle includes a speed detection unit for detecting a vehicle speed, a steering angle detection unit for detecting a steering angle, and a swivel angle determination unit. The swivel angle determination unit determines a swivel angle based only on the detected steering angle when the detected speed is within a first speed range, and based on both the detected steering angle and the detected speed when the detected speed is within a second speed range which is higher than the first speed range. An actuator controls a direction of light from a head light of the vehicle, so that the direction of the light changes in accordance with the determined swivel angle.

11 Claims, 7 Drawing Sheets

HEAD LIGHT DEVICE FOR VEHICLE

CROSS REFERENCE TO RELATED APPLICATION

This application is based on and incorporates herein by reference Japanese patent applications No. 2005-199345 filed on Jul. 7, 2005, No. 2006-41272 filed on Feb. 17, 2006, and No. 2006-104345 filed on Apr. 5, 2006.

FIELD OF THE INVENTION

The present invention relates to a front lighting device for a vehicle which executes swivel control in which a direction of light from a head light of the vehicle is controlled in accordance with a steering operation of a driver of the vehicle.

BACKGROUND OF THE INVENTION

Recently, an adaptive front lighting system (AFS) for a vehicle is used which controls a direction of light from a head light of the vehicle so that the head light illuminates a position which a driver of the vehicle wants to look at. The AFS has a swivel control function, in which an azimuth angle (hereafter referred to as a swivel angle) of the direction of the light is changed around a vertical axis of the vehicle.

More specifically, in the swivel control function, the AFS calculates a swivel angle based on a speed of the vehicle and a steering angle of the vehicle and then controls an actuator so that the actuator controls the direction of the light in accordance with the calculated swivel angle. For example, the direction of light turns right relative to the vehicle on a right-hand curved road and turns left relative to the vehicle on a left-hand curved road. Thus, the driver can clearly see a position in a heading direction of the vehicle in the night.

In particular, a front lighting system is described in US 2005/0047113A1 (JP 2005-96740A) which obtains the swivel angle for controlling the direction of the light by using multiple data maps which define a relation of the swivel angle to the speed and the steering angle.

Figure 10:
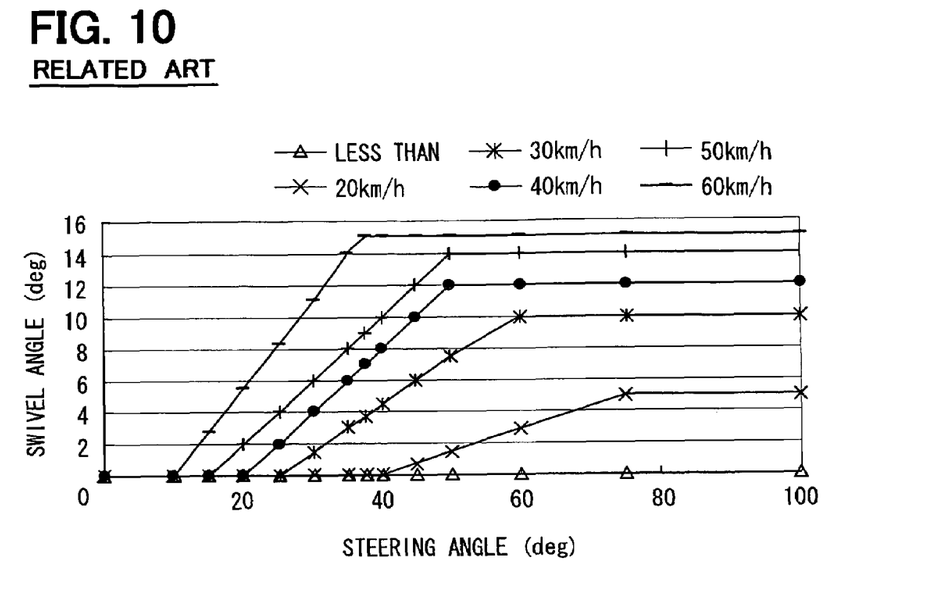
FIG. 10 is a swivel map used in a head light device according to a related art.

Another front lighting system is proposed which calculates the swivel angle so that a ratio of the swivel angle to the steering angle gets larger as the speed of the vehicle gets higher. Such an operation of the conventional front lighting system is designed based on the fact that the driver of the vehicle looks at a position where the vehicle reaches after a particular period. The position where the vehicle reaches after the particular period gets more away from a current position of the vehicle as the speed of the vehicle gets higher. FIG. 10 is a data map defining a relation of the swivel angle to the steering angle for each of several values of the speed of the vehicle. For example, the swivel angle corresponding to 30° of the steering angle becomes 1.5° when the speed is 30 km/h and becomes 11° when the speed is 60 km/h.

Figure 11:
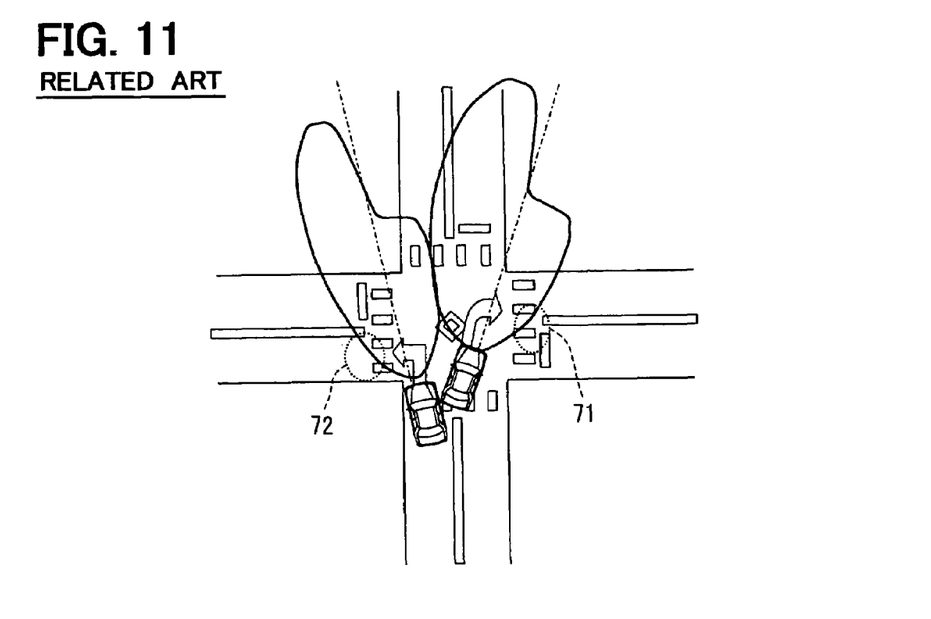
FIG. 11 is a schematic view showing an intersection in the night in which a vehicle having the head light device according to the related art turns right or left.

However, when the vehicle turns right or left in an intersection shown in FIG. 11 with a low speed less than 30 km/h, the swivel angle becomes, as defined in the map in FIG. 10, too small to illuminate crosswalks 71 and 72 sufficiently in the intersection. For example, the maximum value of the swivel angle is 5° when the speed is 20 km/s. Therefore, the front lighting system has a difficulty in filling a need of drivers for better visibility around crosswalks in an intersection in the night.

SUMMARY OF THE INVENTION

It is therefore an object of the present invention to provide a front lighting system which improves visibility around a crosswalk in an intersection in the night.

A front lighting device for a vehicle includes a speed detection unit, a steering angle detection unit, a swivel angle determination unit and an actuator. The speed detection unit detects a speed of the vehicle. The steering angle detection unit detects a steering angle of the vehicle. The swivel angle determination unit determines a swivel angle. The actuator controls a direction of light from a head light of the vehicle, so that the direction of the light changes in accordance with the determined swivel angle.

The swivel angle determination unit determines based on the detected steering angle but irrespective of the detected speed when the detected speed is within the first speed range and based on the detected steering angle and the detected speed when the detected speed is within the second speed range.

Therefore, a target position where the vehicle reaches after a specific period is surely illuminated by the head light when the vehicle is traveling with a speed within the second speed range. In addition, a position in a direction which depends on the detected steering angle and irrespective of the detected speed is surely illuminated by the head light when the vehicle is traveling with a speed within the first range. According to the operation of the front lighting system, when the vehicle travels on a curved road with a middle-high speed in the night, the target position where the vehicle reaches after the specific period can be clearly seen by the driver. In addition, when the vehicle turns left or right in an intersection with a low speed in the night, a crosswalk which the driver looks at with great attention can be clearly seen by the driver.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

Figure 1:
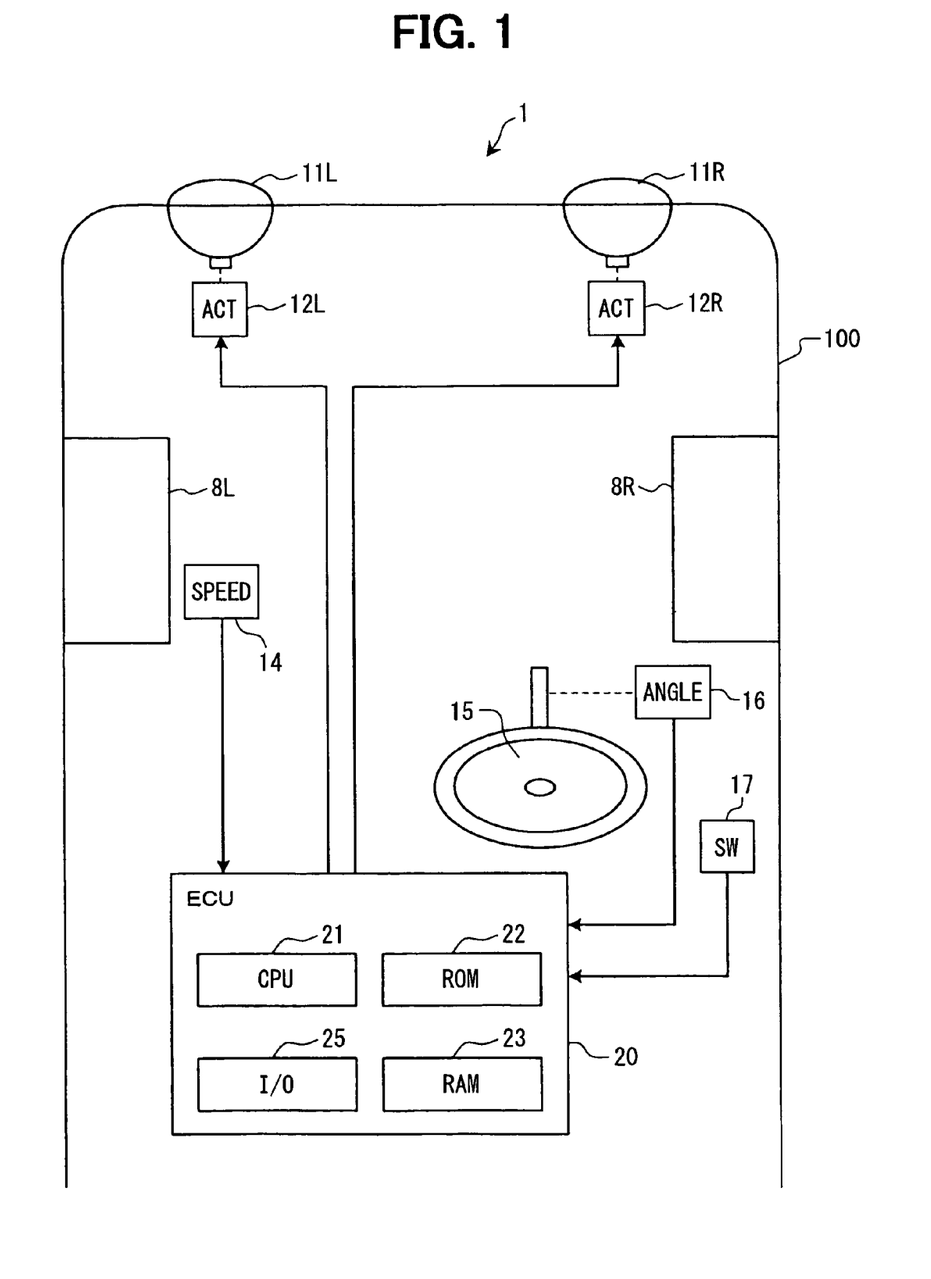
FIG. 1 is a block diagram showing a head light device for a vehicle according to an embodiment of the present invention.

As shown in FIG. 1, a front lighting system 1 installed in a vehicle 100 includes a left hand head light 11L, a right hand head light 11R, a left hand actuator 12L, a right hand actuator 12R, a vehicle speed sensor 14, a steering angle sensor 16, a head light switch 17 and an electric control unit (ECU) 20. The head lights 11L and 11R are respectively located at a front left portion and a front right portion of the vehicle 100. The vehicle speed sensor 14 detects a travel speed of the vehicle 100 and outputs to the ECU 20 a signal indicating the detected speed. The steering angle sensor 16 detects a rotation angle (hereafter referred to as a steering angle) of a steering wheel 15 relative to a neutral steering position and outputs to the ECU 20 a signal indicating the detected rotation angle. The head light switch 17 outputs to the ECU 20 a signal which based on an operation of a user to the head light switch 17 for turning on the head lights 11L and 11R.

The ECU 20 is a logical calculation circuit including a CPU 21, a ROM 22, a RAM 23 and an I/O circuit 25. The ROM 22 stores a control program and swivel angle data in mapped form (swivel maps), which will be described later. The RAM 23 is used by the CPU 21 as a work area for several kinds of calculations.

The actuators 12L and 12R rotates, based on a control signal from the ECU 20, the head lights 11L and 11R around the vertical axis of the vehicle 100. A direction of light from the head lights 11L and 11R are thus controlled within a horizontal plane of the vehicle 100.

Figure 2:
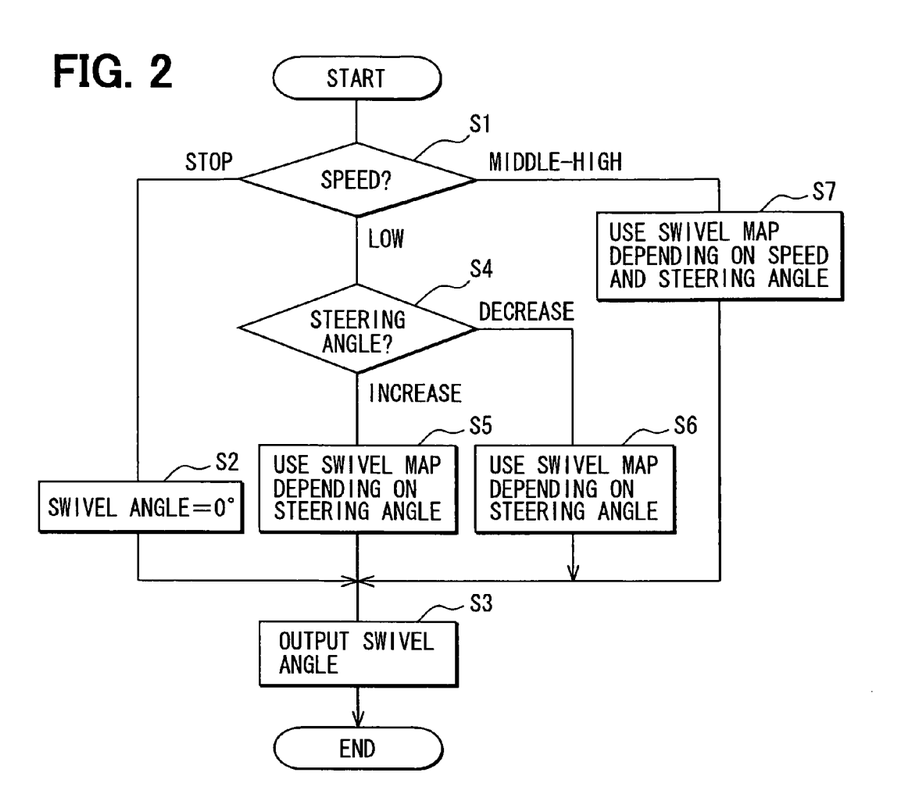
FIG. 2 is a flowchart showing a process for a swivel control process.

The CPU 21 reads from the ROM 22 and executes a swivel control program shown in FIG. 2, while the head light switch 17 is on.

First at a step S1, the CPU 21 selects, from multiple speed ranges including a stop range, a low speed range and a middle-high speed range, a speed range to which the speed of the vehicle detected by the vehicle speed sensor 14 belongs. In the case that the detected speed is lower than 5 km/h, the CPU 21 determines at the step S1 that it is in the stop range and then sets at a step S2 a swivel angle to 0 degree. The swivel angle is an angle in the horizontal plane of the vehicle between the direction of the light from the head lights 11L and 11R and a reference direction. The reference direction is the front direction of the vehicle 100. Subsequently at a step S3, the CPU 21 outputs to each of the actuators 12L and 12R a signal indicating the set swivel angle. The actuators 12L and 12R accordingly control the direction of the light from the head lights 11L and 11R so that it becomes parallel to the front direction of the vehicle 100.

In the case that the detected speed is equal to or more than 5 km/h and smaller than 30 km/h, the CPU 21 determines at the step S1 that it is in the low speed range and then executes a step S4. The CPU 21 determines at the step S4 whether the driver is rotating the steering wheel 15 in an increasing direction in which the steering angle increases relative to the neutral steering position, or in a decreasing direction in which the steering angle decreases relative to the neutral steering position. The increasing direction and the decreasing direction can be a clockwise direction or a counter clockwise direction depending on a current steering angle.

When the driver is rotating the steering wheel 15 in the increasing direction, the CPU 21 subsequently sets at a step S5 the swivel angle based on an upper solid line 51 in a low speed range swivel map in FIG. 3. When the driver is rotating the steering wheel 15 in the decreasing direction, the CPU 21 subsequently sets at a step S6 the swivel angle based on a lower solid line 52 in the low speed range swivel map. More specifically, a low speed range swivel map for right turn is used at the steps S5 and S6 when the vehicle 100 is turning right and a low speed range swivel map for left turn is used at the steps S5 and S6 when the vehicle 100 is turning left. Subsequently at the step S3, the CPU 21 outputs to each of the actuators 12L and 12R a signal indicating the swivel angle set at the step S5 or S6. The actuators 12L and 12R accordingly controls the direction of the light from the head lights 11L and 11R so that it becomes parallel to the swivel angle.

The low speed range swivel maps indicate a correspondence or relation between the steering angle and the swivel angle. As described above, the low speed range swivel maps include the low speed range swivel map for the right turn and the low speed range swivel map for the left turn. The swivel map shown in FIG. 3 shows characteristics which are common to both of the low speed range swivel map for the right turn and the left turn.

Figure 3:
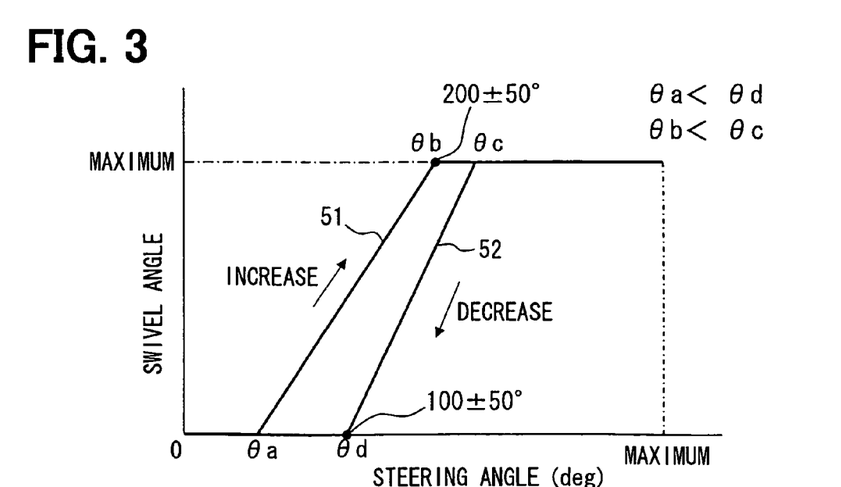
FIG. 3 is a low speed range swivel map.

A swivel start steering angle $\theta a$ in FIG. 3 is a value of the swivel angle at which swivel control starts while the driver is rotating the steering wheel 15 in the increasing direction. While the swivel control is working, the determined swivel angle is kept different from 0 degree. A maximum swivel start steering angle $\theta b$ is a steering angle at which the determined swivel angle reaches at its maximum while the driver is rotating the steering wheel 15 in the increasing direction. The maximum swivel start steering angle $\theta b$ may be set to a value within a range from 150° to 250°, which is an angle range to which the detected angle normally belongs when a driver looks at a crosswalk in turning right or left in an intersection.

A maximum swivel end steering angle $\theta c$ is a steering angle at which the determined swivel angle starts decreasing while the driver is rotating the steering wheel 15 in the decreasing direction. The maximum swivel end steering angle $\theta c$ may be set based on the maximum steering angle in a period in which the vehicle 100 starts turning right or left and end turning right or left in an intersection.

A swivel end steering angle $\theta d$ is a steering angle at which the swivel control ends while the driver is rotating the steering wheel 15 in the decreasing direction. The swivel end steering angle $\theta d$ may be set to a value within a range from 50° to 150°, which is an angle range to which the detected speed normally belongs to when the driver looks at the front direction of the vehicle 100 again in turning right or left in an intersection.

In the low speed range swivel map in FIG. 3, relations $\theta a < \theta d$ and $\theta b < \theta c$ are satisfied. The maximum swivel angle for the right turn and the maximum swivel angle for the left turn are different. For example, the maximum swivel angle for the right turn may be 20° and the maximum swivel angle for the left turn may be 10°.

In the case that the detected speed is equal to or more than 30 km/h, the CPU 21 determines at the step S1 that it is in the middle-high speed range and then executes a step S7. The CPU 21 sets at the step S7 the swivel angle based on a middle-high speed range swivel map in FIG. 4 by using, as parameters, the detected speed of the vehicle 100 and the detected swivel angle. Subsequently at the step S3, the CPU 21 outputs to each of the actuators 12L and 12R a signal indicating the swivel angle set at the step S7. The actuators 12L and 12R accordingly control the direction of the light from the head lights 11L and 11R so that it becomes parallel to the swivel angle.

Figure 4:
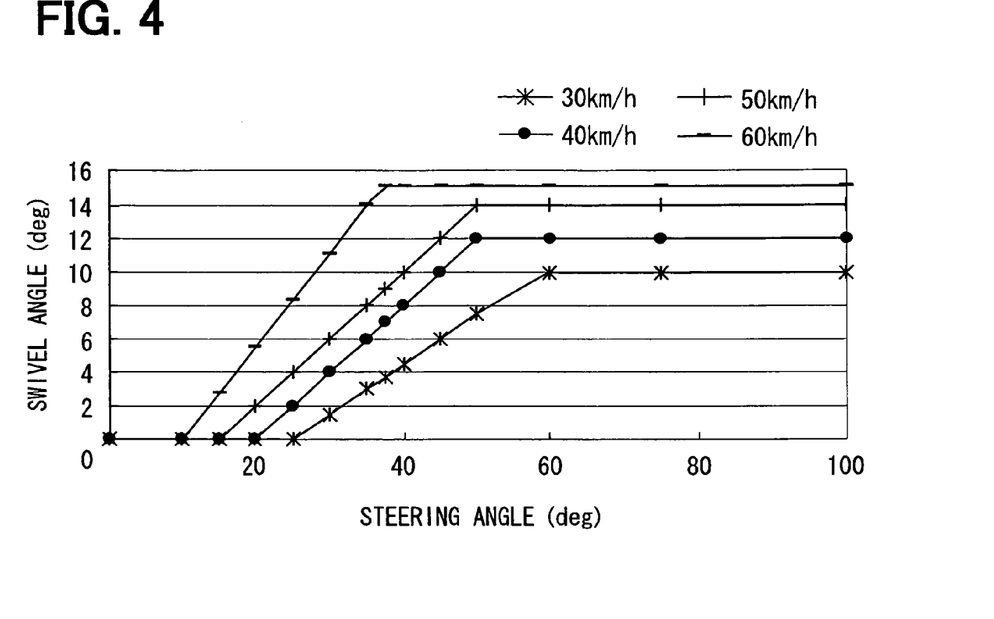
FIG. 4 is a middle-high speed range swivel map.

By using the middle-high speed range swivel map in FIG. 4, the swivel angle is determined from the speed and the steering angle. The middle-high speed range swivel map is stored in the ROM 22. As shown in FIG. 4, a relation between values of the steering angle and values of the swivel angle is defined for each of speeds 30 km/h, 40 km/h, 50 km/h and 60 km/h, which belong to the middle-high speed range. Relations between values of the steering angle and values of swivel angle may also be defined for speeds more than 70 km/h. According to the middle-high speed range swivel map, a swivel angle for a fixed steering angle becomes larger as a speed gets larger. This characteristic is designed based on the fact that an interval between a current position of the vehicle 100 and a position at which the driver looks at the current timing gets longer as the speed of the vehicle gets higher, because the position at which the driver looks at the current timing is a position of the vehicle 100 at a timing when a specific time has passed since the current timing.

In the middle-high speed range map, the relation between the swivel angle and the steering angle may change depending on whether the driver is rotating the steering wheel 15 in the increasing direction or the decreasing direction.

As described above, in the front lighting system 1 according to the present embodiment, the vehicle speed sensor 14 detects the speed of the vehicle 100 and the steering angle sensor 16 detects the steering angle of the steering wheel 15. Then the CPU 21 determines a swivel angle based only on the detected swivel angle when the detected speed is equal to or higher than 5 km/h and is lower than 30 km/h. In another aspect, the CPU 21 determines a swivel angle based on the detected swivel angle and not on the detected speed when the detected speed belongs to the low speed range which is equal to or higher than 5 km/h and is lower than 30 km/h. In contrast, the CPU 21 determines a swivel angle based on the detected swivel angle and the detected speed when the detected speed belongs to the middle-high speed range which is equal to or higher than 30 km/h. Then the actuators 12L and 12R are driven according to the determined swivel angle.

Figure 5:
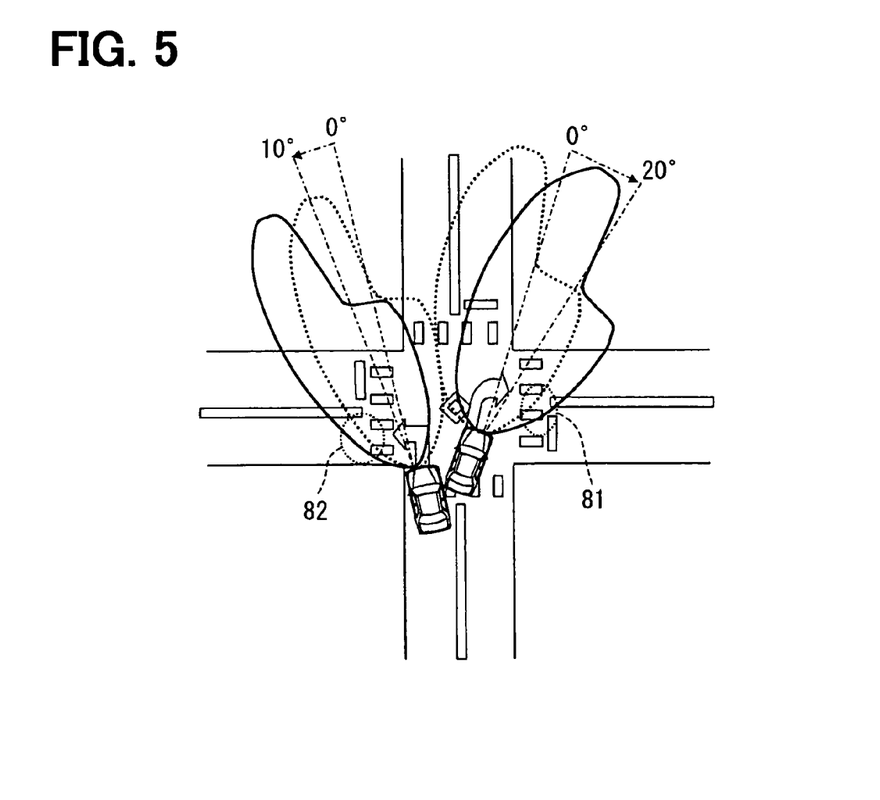
FIG. 5 is a schematic view showing an intersection in the night in which a vehicle having the head light device turns right or left.

Therefore, a target position where the vehicle 100 reaches after a specific period is surely illuminated by the head lights 11L and 11R when the vehicle 100 is traveling with a speed within the middle-high speed range. In addition, a position in a direction which depends on the detected steering angle and not on the detected speed is surely illuminated by the head lights 11L and 11R when the vehicle 100 is traveling with a speed in the low speed range. According to the operation of the front lighting system 1, when the vehicle 100 travels on a curved road with a middle-high speed in the night, the target position where the vehicle 100 reaches after the specific period can be clearly seen by the driver. In addition, when the vehicle 100 turns left or right in an intersection with a low speed in the night, a crosswalk which the driver looks at with great attention can be clearly seen by the driver. For example, as shown in FIG. 5, in which a vehicle having the head light device turns right or left in an intersection in the night. The determined swivel angle in the case of the right turn is equal to 20° and the determined swivel angle in the case of the left turn is equal to 10°. Thus, the driver can clearly see the crosswalks 81 and 82 in both cases.

In particular, in the present embodiment, the ROM 22 stores the low speed range swivel maps which are used to determine the swivel angle based only on the steering angle (in another aspect, based on the steering angle and not on the speed of the vehicle 100). In addition, the ROM 22 stores the middle-high speed range swivel map which is used to obtain the swivel angle based on the steering angle and the speed of the vehicle 100. The CPU 21 can therefore determine the swivel angle based on the low speed range swivel maps when the vehicle 100 travels at a low speed. In addition, the CPU 21 can determine the swivel angle based on the middle-high speed range swivel map when the vehicle 100 travels at a middle-high speed. The CPU 21 can therefore determine, without complicated calculations, the swivel angle depending on the speed of the vehicle, to cause the head lights 11L and 11R to control the actuators 12L and 12R according to the detected swivel angle.

In addition, in the low speed range swivel maps, as shown in FIG. 3, a relation of the swivel angle to the steering angle switches between the case that the driver is rotating the steering wheel 15 in the increasing direction and the case that the driver is rotating the steering wheel 15 in the decreasing direction. The head lights 11L and 11R can therefore illuminate a position outside of the vehicle 100 in accordance with a direction in which the driver looks at the position, although the direction changes in time differently in the case that the steering wheel 15 is rotated in the increasing direction and in the case that the steering wheel 15 is rotated in the decreasing direction.

For example, a change ratio (which corresponds to the gradient of the line 51) of the swivel angle in the case that the steering wheel 15 is rotated in the increasing direction is larger than a change ratio (which corresponds to the gradient of the line 52) of the swivel angle in the case that the steering wheel 15 is rotated in the decreasing direction.

In the case that the vehicle 100 turns left or right in an intersection, the driver changes his/her line of sight slowly toward a crosswalk while the steering wheel 15 is rotated in the increasing direction. In this while, the direction of the light from the head lights 11L and 11R changes in accordance with a relatively small change ratio of the swivel angle as indicated in the low speed range swivel map. While the steering wheel 15 is rotated in the decreasing direction, the line of sight of the driver quickly returns to the front direction of the vehicle 100. In this while, the direction of the light from the head lights 11L and 11R changes in accordance with a relatively large change ratio of the swivel angle as indicated in the low speed range swivel map.

The swivel start steering angle θa, at which the determined swivel angle starts increasing while the steering wheel 15 is rotated in the increasing direction, is smaller than the swivel end steering angle θd, at which the determined swivel angle becomes zero while the driver is rotating the steering wheel 15 in the decreasing direction. It is therefore possible to surely illuminate a position in the line of sight of the driver which varies depending on the status of the vehicle 100 and to make the position easier to look at.

In the case that the vehicle 100 turns left or right in an intersection, the driver starts moving his/her line of sight to a direction toward a crosswalk quickly after the driver starts rotating the steering wheel 15 in the increasing direction. The head lights 11L and 11R start changing orientations of the actuators 12L and 12R when the detected steering angle is relatively small. In contrast, the line of sight of the driver returns to the front direction of the vehicle 100 at an early timing before the driver finishes rotating the steering wheel 15 in the decreasing direction. The determined swivel angle of the head lights 11L and 11R thus returns to zero degree when the detected steering angle is still relatively large.

The maximum swivel start steering angle θb is smaller than the maximum swivel end steering angle θc. The line of sight of the driver quickly reaches to a direction of a crosswalk while the steering wheel 15 is rotated in the increasing direction. The line of sight of the driver quickly starts returning to the front direction of a crosswalk while the steering wheel 15 is rotated in the decreasing direction. Thus, the direction of the light from the head lights 11L and 11R is changed in accordance with the change of the line of sight of the driver.

A DETAILED EXAMPLE

In a detailed example of the present embodiment, the low speed range swivel map is composed based on results of experiments in which a vehicle has turned right and left for nine times in two intersections having crosswalks. In the experiments, two drivers drove the vehicle on left-hand traffic roads each of which has a single lane in each of the directions along itself. In the experiment, the speed and the steering angle of the vehicle are measured at timings when the drivers look at the crossroads, timings when the steering angle reaches the maximum, timings when the drivers look at a position in the front direction of the vehicle.

From some of the results of the experiments in which the vehicle turns right, it has become clear that (1) the steering angle is within a range from about 75° to about 300° when the one of the drivers looks at one of the crosswalks, that (2) the maximum value of steering angle through each of the experiments is within a range from about 250° to about 350°, that (3) the steering angle is within a range from about 100° to about 300° when one of the drivers looks at a position in the front direction of the vehicle, and that (4) the speed of the vehicle becomes 28 km/h at its maximum while the vehicle is turning in the intersections.

From some of the results of the experiments in which the vehicle turns left, it has become clear that (1) the steering angle is approximately 0° when the one of the drivers looks at one of the crosswalks. This comes from a fact that the drivers look at the crosswalks before the drivers start rotating the steering wheel. In addition, it has become clear that (2) the maximum value of steering angle through each of the experiments is within a range from about 250° to about 350°, that (3) the steering angle is within a range from about 100° to about 300° when one of the drivers looks at a position in the front direction of the vehicle, and that (4) the speed of the vehicle becomes 32 km/h at its maximum while the vehicle is turning in the intersections.

Figure 6:
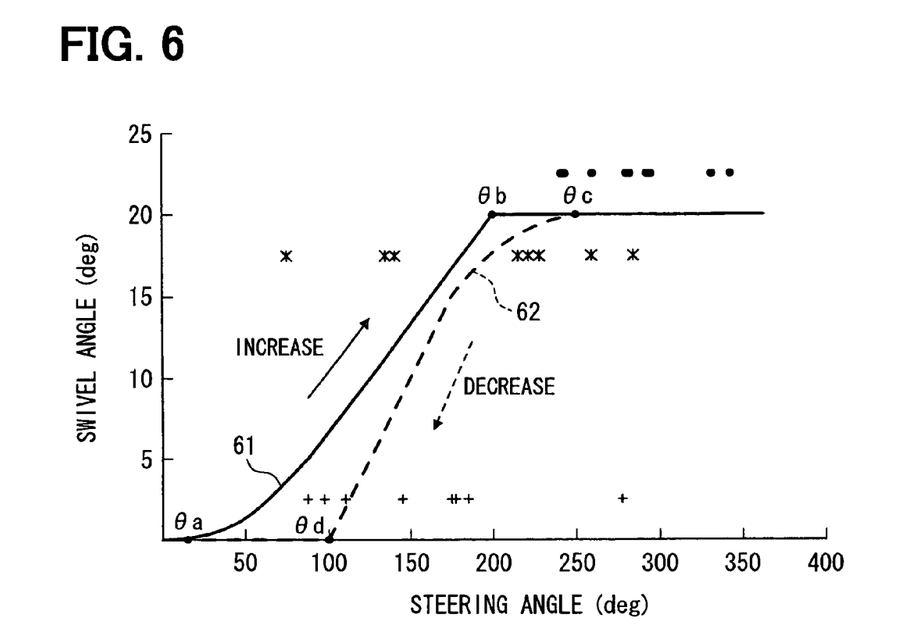
FIG. 6 is an example of low speed range swivel map for right turn.

Based on the results of the experiments, the low speed range swivel map for the right turn shown in FIG. 6 is composed. In FIG. 6, experimental results are plotted as well as the low speed range swivel map for the right turn. More specifically, the maximum experimental steering angles are plotted by filled circles (●), the experimental steering angles when the drivers looked at the crosswalks are plotted by asterisks (*), and the experimental steering angles when the lines of sight of the drivers returned to the front direction are plotted by plus marks (+). The low speed range swivel map for the right turn is used when the vehicle 100 is turning right and the detected speed of the vehicle 100 is in a range from 5 km/h to 30 km/h. The speed of 5 km/h is the minimum threshold used to distinguish a static state and a traveling state of the vehicle. The upper limit (that is, 30 km/h) of the range is designed based on an experimental result that the speed of the vehicle becomes 28 km/h at its maximum while the vehicle is turning right in the intersections.

In the low speed range swivel map for the right turn shown in FIG. 6, the swivel start steering angle θa is nearly equal to 25°, which is smaller than the minimum value of the experimental steering angles when the drivers looked at the crosswalks. The maximum swivel start steering angle θb is nearly equal to 200°, which is designed based on an average of the experimental steering angles when the drivers looked at the crosswalks. The maximum swivel angle for the right turn is nearly equal to 20°. The maximum swivel end steering angle θc is nearly equal to 250°, which is designed to reduce quickly the swivel angles and is designed to be approximately the minimum value of the experimental steering angles when the drivers looked at the crosswalks. The swivel end steering angle θd is nearly equal to 100°, which is designed based on an average of the experimental steering angles when the lines of sight of the drivers returned to the front direction.

In addition, as shown in curves in the lines 61 and 62, the swivel angle is designed to change smoothly just after the driver starts rotating the steering wheel 15 in each of the increasing direction or the decreasing direction. Furthermore, the change ratio (that is, the gradient of the swivel map) of the swivel angle relative to the steering angle is larger when the steering wheel 15 is rotated in the decreasing direction than when the steering wheel 15 is rotated in the increasing direction.

Figure 7:
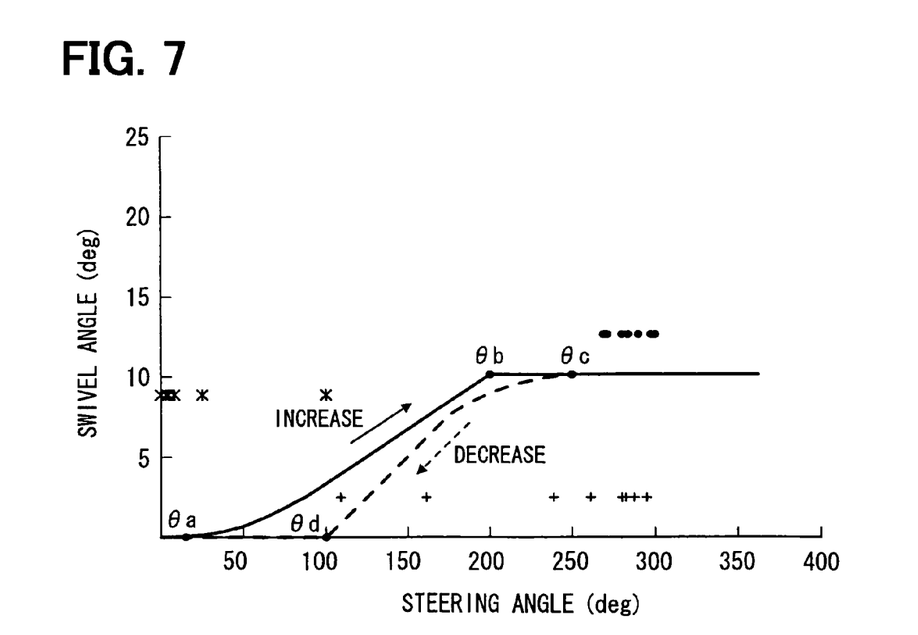
FIG. 7 is an example of low speed range swivel map for left turn.

The low speed range swivel map for the left turn shown in FIG. 7 is composed, based on the low speed range swivel map for the right turn shown in FIG. 6. In FIG. 7, experimental results are plotted as well as the low speed range swivel map for the left turn. More specifically, the maximum experimental steering angles are plotted by filled circles (●), the experimental steering angles when the drivers looked at the crosswalks are plotted by asterisks (*), and the experimental steering angles when the lines of sight of the drivers returned to the front direction are plotted by plus marks (+). As shown by asterisks (*) in FIG. 7, most of the experimental steering angles when the drivers looked at the crosswalks in the left turn are approximately 0° (which corresponds to traveling straight) and therefore a relation between the steering angle and a timing at which the swivel control starts is not clear. In view of this, the low speed range swivel map for the left turn is composed by scaling the low speed range swivel map for the right turn in the direction of swivel angle, so that the maximum swivel angle becomes 10° while the steering angles θa, θb, θc and θd are kept unchanged.

Next, the change of the swivel angle of the head lights 11L and 11R according to the detailed example is described with reference to FIGS. 8A, 8B, 9A and 9B in comparison with a comparative example (related art) in which a swivel map shown in FIG. 10 is used to determine the swivel angle. In each of FIGS. 8A, 8B, 9A and 9B, the steering angle in the detailed example is plotted by an alternate long and two short dashes line, the speed of the vehicle in the detailed example is plotted by an alternate long and single short dash line, the swivel angle in the comparative example is plotted by a broken line, and the swivel angle in the detailed example is plotted by a solid line.

Figure 8A:
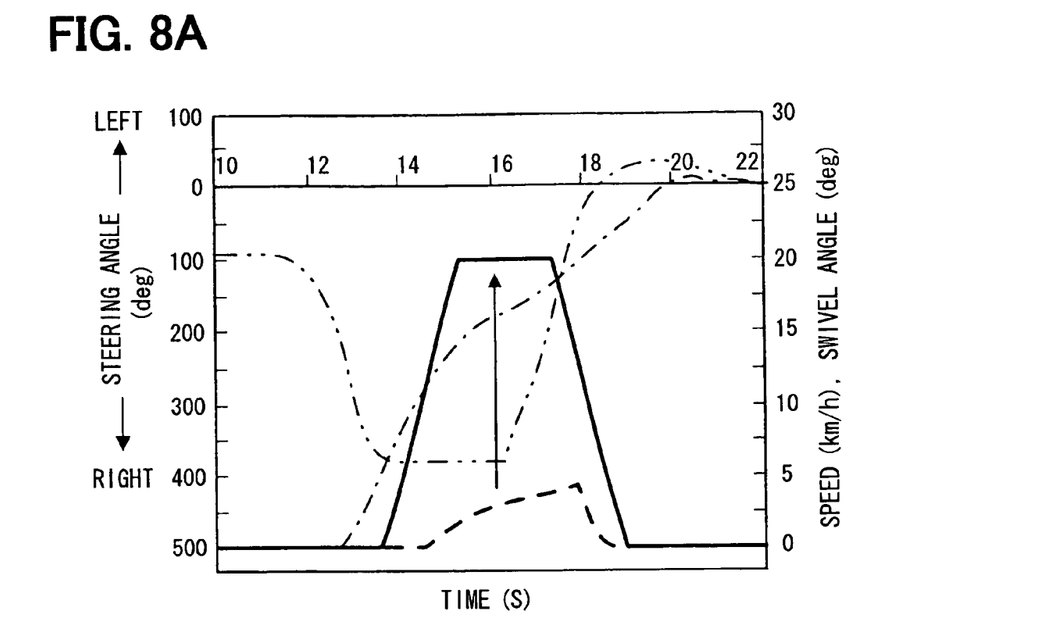
FIG. 8A is a graph showing time variation of a swivel angle for right turn with a stop in an intersection according to the example shown in FIG. 6 and time variation of a swivel angle according to a comparative example.
Figure 8B:
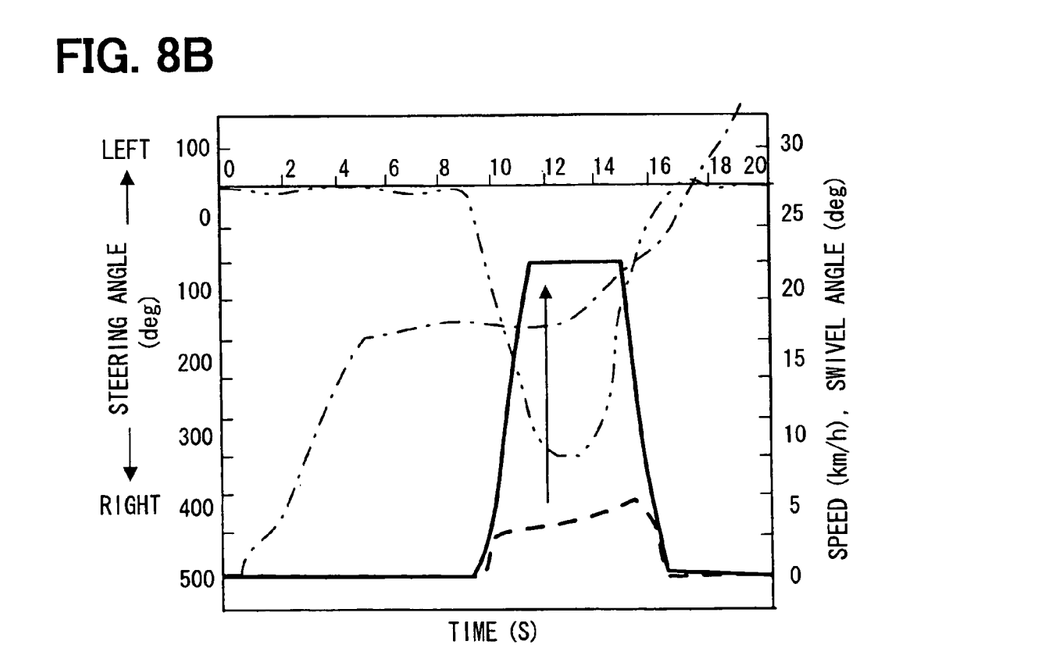
FIG. 8B is a graph showing time variation of a swivel angle for right turn without a stop in an intersection according to the example shown in FIG. 6 and time variation of a swivel angle according to the comparative example.

As shown in FIG. 8A, when the vehicle 100 temporarily stops in an intersection and then turns right, the swivel angle for the detailed example reaches the maximum swivel angle 20° at a timing corresponding to 16 seconds in FIG. 8A, while the swivel angle for the comparative example is only 2.5° at the timing corresponding to 16 seconds in FIG. 8A. As shown in FIG. 8B, when the vehicle 100 turns right in an intersection without stopping temporarily, the swivel angle for the detailed example reaches the maximum swivel angle 20° at a timing corresponding to 12 seconds in FIG. 8B, while the swivel angle for the comparative example is only 2.5° at the timing corresponding to 12 seconds.

Figure 9A:
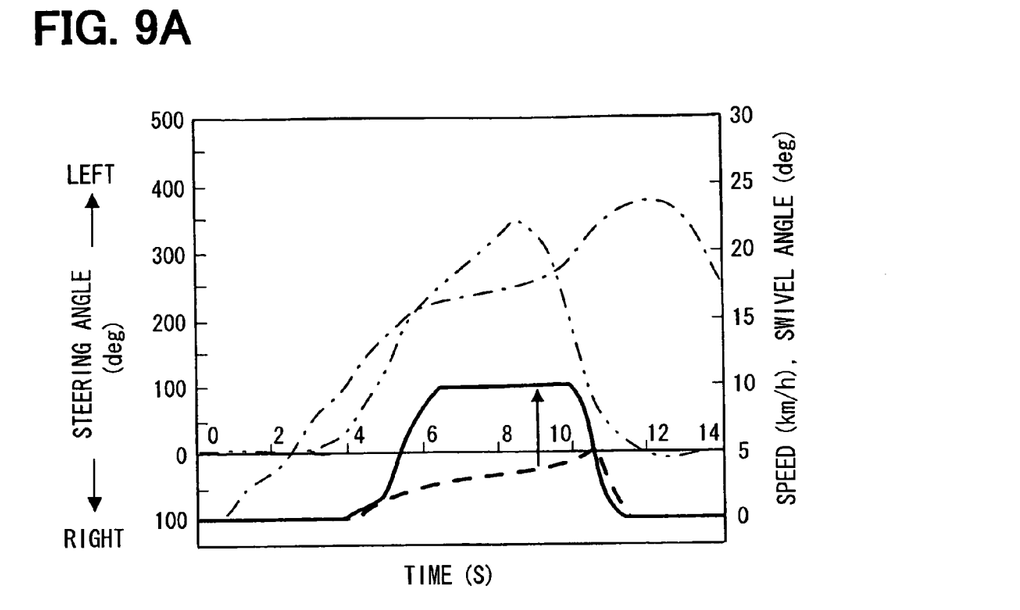
FIG. 9A is a graph showing time variation of a swivel angle for left turn with a stop in an intersection according to the example shown in FIG. 6 and time variation of a swivel angle according to the comparative example.
Figure 9B:
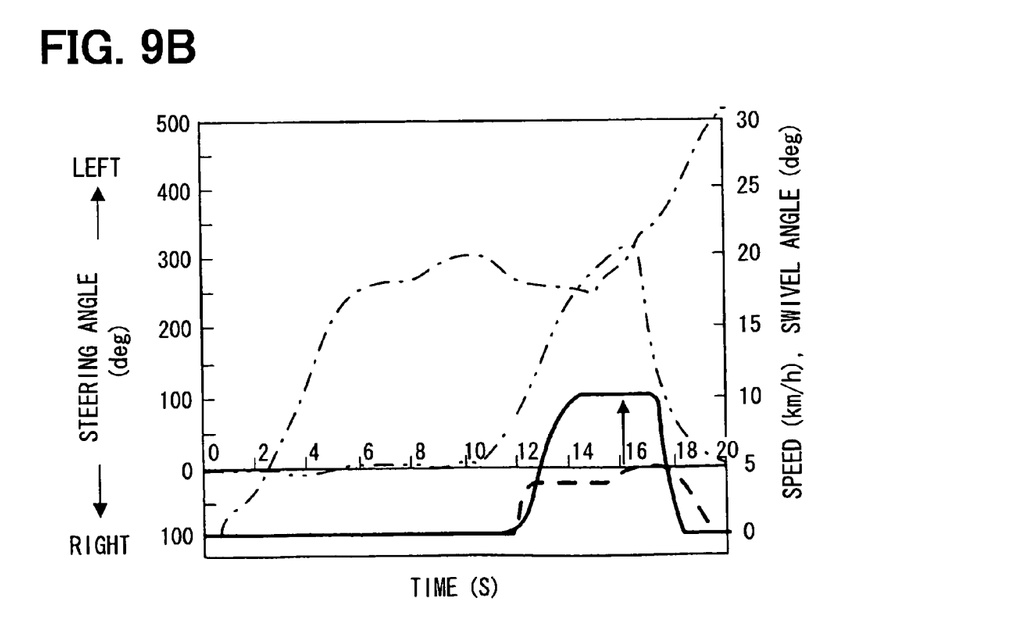
FIG. 9B is a graph showing time variation of a swivel angle for left turn without a stop in an intersection according to the example shown in FIG. 6 and time variation of a swivel angle according to the comparative example.

As shown in FIG. 9A, when the vehicle 100 temporarily stops in an intersection and then turns left, the swivel angle for the detailed example reaches the maximum swivel angle 10° at a timing corresponding to 9 seconds in FIG. 9A, while the swivel angle for the comparative example is only 3° at the timing corresponding to 9 seconds in FIG. 9A. As shown in FIG. 9B, when the vehicle 100 turns left in an intersection without stopping temporarily, the swivel angle for the detailed example reaches the maximum swivel angle 10° at a timing corresponding to 16 seconds in FIG. 9B, while the swivel angle for the comparative example is only 4° at a timing corresponding to 16 seconds in FIG. 9B.

In addition, in all cases shown in FIGS. 8A, 8B, 9A and 9B, the swivel control for the detailed example starts and ends quickly, compared to the comparative example.

The present invention should not be limited to the embodiment discussed above and shown in the figures, but may be implemented in various ways without departing from the spirit of the invention.

For example, the CPU 21 may obtain the swivel angle to control the head lights 11L and 11R through a calculation process without using the low speed range swivel maps and the middle-high speed range swivel map.

The front lighting system 1 may have a leveling function in which the ECU 20 controls the direction of the light in a vertical plane of the vehicle.

The above descriptions are made for left-hand traffic roads which are common in some countries such as Japan or Britain. However, the above description can be applied to the right-hand traffic road which are common in some countries such as the United States or Germany, by changing the words "left" into "right" and changing the words "right" into "left".

What is claimed is:

1. A front lighting device for a vehicle, comprising:
   a speed detection unit for detecting a speed of the vehicle;
   a steering angle detection unit for detecting a steering angle of the vehicle;
   a swivel angle determination unit for determining a swivel angle based on the detected steering angle but not based on the detected speed when the detected speed is within a first speed range, and based on both the detected steering angle and the detected speed when the detected speed is within a second speed range which is higher than the first speed range; and
   an actuator for controlling a direction of light from a head light of the vehicle, so that the direction of the light changes in accordance with the determined swivel angle.

2. The front lighting device according to claim 1, wherein the swivel angle determination unit:
   stores a first map defining a relation of the swivel angle only to the detected speed and a second map defining a relation of the swivel angle to the detected steering angle and the detected speed; and
   determines the swivel angle by using the first map when the detected speed is within the first speed range and by using the second map when the detected speed is within the second speed range.

3. The front lighting device according to claim 1, wherein the swivel angle determined when the detected speed is within the first speed range varies depending on whether the detected steering angle is increasing or decreasing.

4. The front lighting device according to claim 3, wherein a ratio of change of the swivel angle to change of the detected steering angle is larger when the detected steering angle is decreasing than when the detected steering angle is increasing.

5. The front lighting device according to claim 3, wherein:
   a swivel start steering angle is smaller than a swivel end steering angle;
   at the swivel start steering angle, the determined swivel angle starts increasing while the detected steering angle is increasing; and
   at the swivel end steering angle, the determined swivel angle becomes zero while the detected steering angle is decreasing.

6. The front lighting device according to claim 5, wherein the swivel end steering angle is designed based on a steering angle at which it has been determined that a driver of the vehicle will look at a position in a front direction of the vehicle when the vehicle turns left or right in an intersection.

7. The front lighting device according to claim 3, wherein:
   a maximum swivel start steering angle is smaller than a maximum swivel end steering angle;
   at the maximum swivel start steering angle, the determined swivel angle reaches at its maximum while the detected steering angle is increasing; and
   at the maximum swivel end steering angle, the determined swivel angle starts decreasing while the detected steering angle is decreasing.

8. The front lighting device according to claim 7, wherein the maximum swivel start steering angle is designed based on a steering angle at which it has been determined that a driver of the vehicle will look at a crosswalk in an intersection when the vehicle turns left or right in the intersection.

9. The front lighting device according to claim 7, wherein the maximum swivel end steering angle is designed based on a maximum value of a steering angle throughout a period in which the vehicle turns right or left in an intersection.

10. The front lighting device according to claim 1, wherein the first speed range is a range smaller than about 30 km/h and the second speed range is a range larger than about 30 km/h.

11. The front lighting device according to claim 1, wherein the swivel angle determination unit for determining a swivel angle based only on the detected steering angle when the detected speed is within a first speed range and based on the detected steering angle and the detected speed when the detected speed is within a second speed range which is higher than the first speed range.

* * * * *